US012780996B2

(12) United States Patent
Kozminski

(10) Patent No.: US 12,780,996 B2
(45) Date of Patent: Nov. 3, 2026

(54) SOLUTION MASTERBATCH WITH RESONANT ACOUSTIC MIXING

(71) Applicant: Bridgestone Corporation, Chuo-ku (JP)

(72) Inventor: Piotr Kozminski, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 904 days.

(21) Appl. No.: 18/147,933

(22) Filed: Dec. 29, 2022

(65) Prior Publication Data

US 2023/0203255 A1 Jun. 29, 2023

Related U.S. Application Data

(60) Provisional application No. 63/266,128, filed on Dec. 29, 2021.

(51) Int. Cl.
*C08J 3/28* (2006.01)
*C08J 3/22* (2006.01)
*C08J 3/24* (2006.01)

(52) U.S. Cl.
CPC . *C08J 3/22* (2013.01); *C08J 3/24* (2013.01); *C08J 3/28* (2013.01); *C08J 2307/00* (2013.01)

(58) Field of Classification Search
None
See application file for complete search history.

(56) References Cited

U.S. PATENT DOCUMENTS

| | | | | |
|---|---|---|---|---|
| 4,578,411 | A | 3/1986 | Budd | |
| 6,048,923 | A | 4/2000 | Mabry | |
| 6,127,468 | A | 10/2000 | Cruse | |
| 6,204,339 | B1 | 3/2001 | Waldman | |
| 6,528,673 | B2 | 3/2003 | Cruse | |
| 6,635,700 | B2 | 10/2003 | Cruse | |
| 6,649,684 | B1 | 11/2003 | Okel | |
| 6,683,135 | B2 | 1/2004 | Cruse | |
| 7,188,993 | B1 | 3/2007 | Howe | |
| 7,255,895 | B2 | 8/2007 | Banerjee | |
| 8,883,264 | B2 | 11/2014 | Yang | |
| 2015/0290135 | A1 | 10/2015 | Chamarthy | |
| 2019/0048150 | A1 | 2/2019 | Adler | |
| 2020/0062669 | A1 * | 2/2020 | Burn | C06B 45/10 |
| 2020/0308375 | A1 * | 10/2020 | Tardiff | C08L 7/00 |
| 2022/0281138 | A1 * | 9/2022 | Esseghir | C08L 23/04 |
| 2022/0372235 | A1 * | 11/2022 | Tartamella | G01N 33/52 |

FOREIGN PATENT DOCUMENTS

| | | | |
|---|---|---|---|
| GB | 2572372 | A | 10/2019 |
| WO | 2014078258 | A1 | 5/2014 |

* cited by examiner

*Primary Examiner* — Megan Mcculley
(74) *Attorney, Agent, or Firm* — Meredith E. Hooker; Daniel J. Hudak, Jr.

(57) ABSTRACT

Methods for producing an uncured masterbatch material from a solution masterbatch that includes an uncured polymer, for example a polydiene such as present in a guayule cement, a diluting liquid and a particulate filler. The solution masterbatch is subjected to resonant acoustic mixing which provides excellent dispersion of the solution components and leads to a masterbatch material having desirable properties. After resonant acoustic mixing, the solution masterbatch can be dried and further processed with other components and a curative to prepare a vulcanized composition.

19 Claims, 2 Drawing Sheets

SOLUTION MASTERBATCH WITH RESONANT ACOUSTIC MIXING

CROSS-REFERENCE TO RELATED APPLICATION

This application claims priority to and any other benefit of U.S. Provisional Patent Application Ser. No. 63/266,128 filed Dec. 29, 2021, the entire disclosure of which is incorporated by reference herein.

FIELD OF THE INVENTION

The present invention relates to methods for producing an uncured masterbatch material from a solution masterbatch that includes an uncured polymer, for example a polydiene polymer such as present in a guayule cement, a diluting liquid and a particulate filler. The solution masterbatch is subjected to resonant acoustic mixing which provides excellent dispersion of the solution components and leads to a masterbatch material having desirable properties. After resonant acoustic mixing, the solution masterbatch can be dried and further processed with other components and a curative to prepare a vulcanized composition.

BACKGROUND OF THE INVENTION

Prior to vulcanizing a rubber composition useful to manufacture tires or other rubber based goods, many different methods have been used in the art to pre-mix at least two different components to form a masterbatch, including dry mixing and wet mixing.

While dry mixing components to produce a masterbatch is commonly utilized, such methods can have a high cost of operation due to energy requirements needed for mixing.

Various wet mixing techniques for blending rubbers or elastomers with additives are disclosed in the literature, see for example U.S. 2019/0048150 wherein an elastomer composite is prepared by diluting a neat elastomer composite prepared by a suitable wet masterbatch technique and having a certain filler content, e.g., a loading level of at least 55 phr, for example, at least 60 phr (parts per hundred rubber by weight), with a second or additional elastomer material, thus generating an elastomer composite blend having a filler content at least 5 phr, for example, at least 10 phr less than the elastomer composite.

U.S. Pat. No. 4,578,411 discloses a process for the production of a reportedly tack-free, pourable, filler containing elastomer powder which comprises; (a) dispersing a carbon black filler in water; (b) mixing the thus dispersed carbon black filler with an elastomer solution and a surfactant to produce an elastomer emulsion; (c) coagulating the emulsion; (d) partitioning the coagulated elastomer emulsion with a coating resin which is comprised of at least one copolymer containing from 70% to 97% by weight vinyl aromatic monomers and from 3% to 30% by weight diene monomers; and (e) filtering, washing and drying the resultant powder.

U.S. Pat. No. 6,048,923 discloses elastomer composites produced by continuous flow methods and apparatus in which fluid streams of particulate filler and elastomer latex are fed to the mixing zone of a coagulum reactor to form a mixture in semi-confined flow continuously from the mixing zone through a coagulum zone to a discharge end of the reactor. The particulate filler fluid is fed under high pressure to the mixing zone, such as to form a jet stream to entrain elastomer latex fluid sufficiently energetically to substantially completely coagulate the elastomer with the particulate filler prior to the discharge end. Elastomer coagulation is achieved without the need for a coagulation step involving exposure to acid or salt solution or the like.

Still another mixing method includes resonant acoustic mixing or resonant vibratory mixing, which is a process by which energy is acoustically transferred to a mixture of components to be mixed. Resonant acoustic mixing has been described, for example in U.S. Pat. No. 7,188,993. Resonant acoustic mixing has been utilized in numerous fields to produce various compositions, see for example U.S. Pat. No. 7,255,895, WO 2014/078258, U.S. Pat. No. 8,883,264, U.S. 2015/0290135, GB 2572372, and U.S. 2020/0062669.

SUMMARY OF THE INVENTION

In view of at least the above noted methods, the art still needs a process for preparing a solution masterbatch comprising an uncured polymer, a diluting liquid and a particulate filler, such as a carbon black, as well as a dried masterbatch material produced therefrom, and further a vulcanizable composition including the masterbatch material and a curative. These needs and others are fulfilled by the processes of the present invention which include the use of resonant acoustic mixing to ultimately provide a vulcanized component having desirable performance properties such as reduced hysteresis as well as superior filler dispersion and decreased filler agglomeration.

The methods of the invention also improve process throughput time via elimination of mixing stages. Processing the components in solution form using resonant acoustic mixing produces a solution masterbatch which can, in some embodiments, be sent directly to a final mixing stage where curatives are added. In some embodiments, additional dry mixing and remilling are not necessary, saving time and expense associated with these operations.

Therefore, in one embodiment of the present invention, a method for producing a solution masterbatch is provided, comprising the steps of forming a composition comprising an uncured polymer, such as guayule cement; a diluting liquid; and a particulate filler, such as carbon black; and subjecting the composition to resonant acoustic mixing to form the solution masterbatch.

In a further embodiment, the solution masterbatch is dried to form an uncured masterbatch material.

In still a further embodiment, a method for forming a vulcanizable composition is disclosed, comprising the step of combining the masterbatch material with a curative.

In one or more embodiments of the invention, the polymer component comprises natural rubber, which is in the form of cis-1,4-polyisoprene.

In a particularly preferred embodiment of the present invention, the particulate filler has one or more of a powdered and non-agglomerated form. Carbon blacks are highly preferred.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

Figure 1:
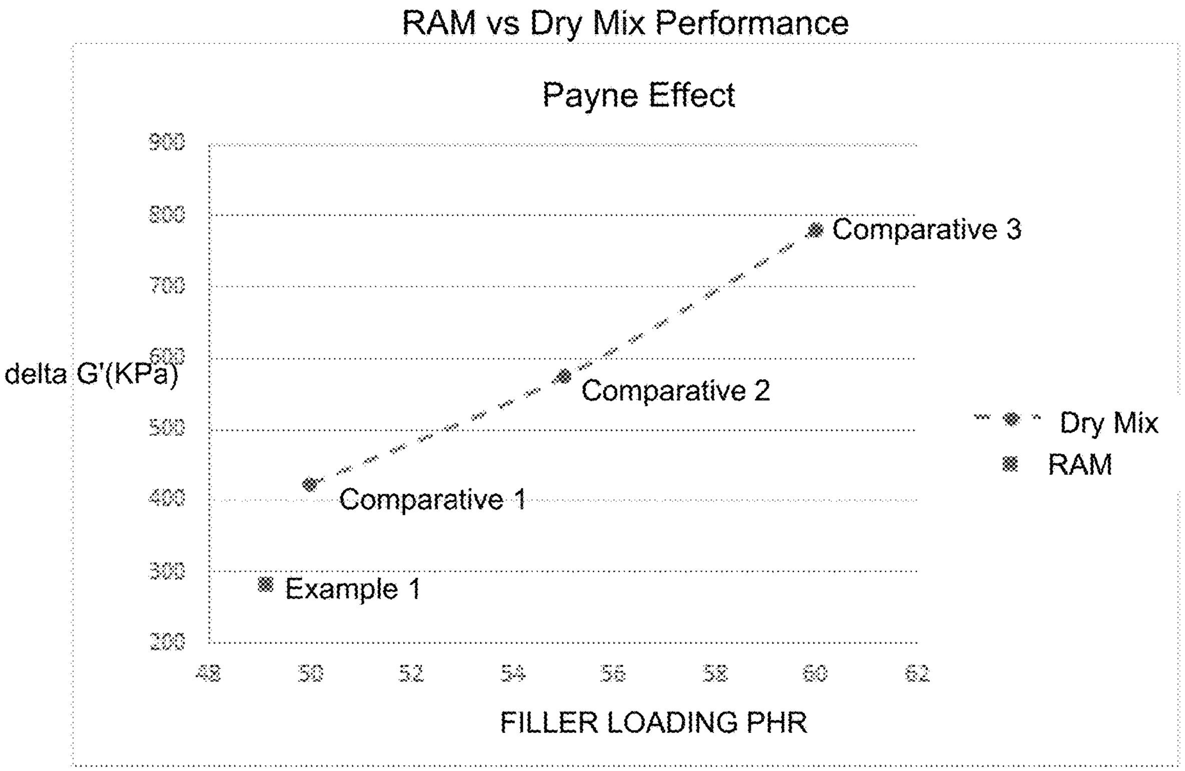
FIG. 1 is a graph illustrating resonant acoustic mixing versus dry mixing performance with respect to Delta G' (Payne Effect), with the results showing superior filler dispersion utilizing resonant acoustic mixing equipment.

The methods of the present invention include steps for producing a solution masterbatch utilizing resonant acoustic mixing, wherein the solution masterbatch includes an uncured polymer component, preferably comprising a guayule cement; a diluting liquid; and a particulate filler, preferably carbon black. The particulate filler is added to the polymer while it remains in the solution phase with a diluting liquid. The composition is subjected to resonant acoustic mixing to form the solution masterbatch which is then dried with the particulate filler embedded. The masterbatch material produced from the solution masterbatch is used in various embodiments to make vulcanizable rubber compositions. In particulate embodiments, these vulcanizable rubber compositions are used in the manufacture of tire components.

Using resonant acoustic mixing to form the solution masterbatch is highly efficient which reduces costs of operation and increases throughput on a process line. In various embodiments, the method allows elimination of dry mixing which also saves energy costs. Rubber goods, such as tires, can be produced from the resonant acoustic mixed solution masterbatch.

Polymer Component

The compositions of the invention utilized to form the solution masterbatch include at least one polymer that is vulcanizable with a curative. As utilized herein, the term "polymer" includes homopolymers, namely polymers formed from the same monomers, as well as copolymers, namely polymers formed from two or more different monomers.

One or more polydiene polymers are utilized in producing the masterbatch material and vulcanized compositions of the invention. The polydiene includes carbon-carbon double bonds and thus are unsaturated and can be cured or vulcanized as known in the art.

The polydiene polymers may be derived at least in part from conjugated or non-conjugated diene monomers. The amount of unsaturation along the chain will of course vary depending upon the specific polymers utilized.

Non-limiting examples of polydiene polymers suitable for use in the present invention include, but are not limited to:

(a) a homopolymer obtained by polymerization of a conjugated diene monomer having from 4 to 12 carbon atoms;

(b) a copolymer obtained by copolymerization of a first conjugated diene monomer with one or more of a second different conjugated diene monomer and one or more ethylenically unsaturated monomers;

(c) a homopolymer obtained by polymerization of a non-conjugated diene monomer having from 5 to 12 carbon atoms;

(d) a copolymer obtained by copolymerization of a first non-conjugated diene and one or more of a second, different non-conjugated diene and one or more ethylenically unsaturated monomers;

(e) a ternary copolymer obtained by copolymerization of ethylene, an alpha-olefin having from 3 to 6 carbon atoms and a non-conjugated diene monomer having from 6 to 12 carbon atoms;

(f) a copolymer of isobutylene and isoprene, optionally halogenated;

(g) one or more of guayule rubber and natural rubber;

(h) an unsaturated olefinic copolymer, the chain of which comprises at least olefinic monomer units, and diene units derived from at least one conjugated diene; or (i) a mixture of two or more of (a) to (h) with one another.

Examples of suitable conjugated diene monomers useful for synthesizing polymers (a), (b) and (h), include, but are not limited to, 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene.

Examples of non-conjugated diene monomers suitable for synthesizing polymers (c), (d) and (e), include, but are not limited to 1,4-pentadiene, 1,4-hexadiene, ethylidenenorbornene and dicyclopentadiene.

Ethylenically unsaturated monomers able to be used in the copolymerization with one or more conjugated or non-conjugated diene monomers to synthesize copolymers (b) or (d), include, but are not limited to vinylaromatic compounds having from 8 to 20 carbon atoms, such as, for example, styrene, ortho-, meta- or para-methylstyrene, vinylmesitylene, divinylbenzene and vinylnaphthalene; vinyl nitrile monomers having 3 to 12 carbon atoms, such as, for example, acrylonitrile and methacrylonitrile; acrylic ester monomers derived from acrylic acid or methacrylic acid with alcohols having from 1 to 12 carbon atoms, such as, for example, methyl acrylate, ethyl acrylate, propyl acrylate, n-butyl acrylate, isobutyl acrylate, 2-ethylhexyl acrylate, methyl methacrylate, ethyl methacrylate, n-butyl methacrylate and isobutyl methacrylate.

Copolymers (b) or (d) may contain between 99% by weight and 1% by weight of diene units and between 1% by weight and 99% by weight of vinylaromatic, vinyl nitride and/or acrylic ester units.

Mono-olefin monomer suitable for synthesizing polymers (h), include, but are not limited to ethylene or an alpha-olefin having from 3 to 6 carbon atoms, for example propylene, butylene or isobutylene. Preferably, the mono-olefin monomer is ethylene, butylene and/or isobutylene.

According to certain embodiments, the olefinic copolymer (h) able to be used in the invention is a copolymer, the chain of which comprises olefinic monomer units, that is to say units derived from the insertion of at least one mono-olefin, and diene units derived from at least one conjugated diene. According to other embodiments, the units are not entirely units derived from diene monomers and mono-olefinic monomers. According to these embodiments, other units derived for example from an ethylenically unsaturated monomer as described above are present in the carbon-based chain. In some embodiments, the olefinic monomer units in polymer (h) are predominant, that is present at a molar content greater than 50% or more relative to the polymer.

Based on the above description, examples of suitable polydiene polymers include, but are not limited to polybutadiene, polyisoprene or polychloroprene and their hydrogenated versions, polyisobutylene, block copolymers of butadiene and isoprene with styrene and their hydrogenated versions, such as poly(styrene-b-butadiene) (SB), poly(styrene-b-butadiene-b-styrene) (SBS), poly(styrene-b-isoprene-b-styrene) (SIS), poly[styrene-b-(isoprene-stat-butadiene)-b-styrene] or poly(styrene-b-isoprene-b-butadiene-b-styrene) (SIBS), hydrogenated SBS (SEBS), poly(styrene-b-butadiene-b-methyl methacrylate) (SBM) and also its hydrogenated version (SEBM), random copolymers of butadiene with styrene (SBR) and acrylonitrile (NBR) and their hydrogenated versions, random copolymers of isoprene with styrene (SIR) and their hydrogenated versions, random copolymers of isoprene and butadiene with styrene (SBIR) and their hydrogenated versions, butyl or halogenated rubbers, ethylene-propylene-diene terpolymers (EPDM), ethylene-diene copolymers and mixtures thereof.

In a preferred embodiment the polymer includes cis-1,4-polyisoprene.

Natural rubber, which is in the form of cis-1,4-polyisoprene, is found in latex form within various trees, shrubs and plants, e.g., *Hevea brasiliensis,* (i.e., the Amazonian rubber tree), *Castilla elastica* (i.e., the Panama rubber tree), various *Landophia* vines (*L. kirkii, L. heudelotis,* and *L. owariensis*), various dandelions (i.e., *Taraxacum* species of plants), and *Parthenium argentatum* (guayule shrubs). The latex of the guayule shrub is trapped intracellularly in the plant cells, is in contrast with other sources, such that of the *Heavea* tree, which is trapped intercellularly. As a result, guayule shrub plant cells must be ruptured to obtain the natural latex. The product obtained from guayule shrub is therefore believed to be unique from at least the standpoint that it contains several constituents, such as resin and low molecular weight polymers. Several purification techniques have been developed to isolate the high molecular weight fractions cis-1,4-polyisoprene, which enables use of the rubber in industrially significant uses.

In a particularly preferred embodiment, the polymer utilized is present in a polydiene polymer cement, which includes the polymer. The polymer is included in the solids portion of the cement, and other constituents, for example as disclosed below, may also be present in the solids portion. The solids portion may include dissolved solids and suspended or dispersed solids.

In one or more embodiments, the polydiene polymer cement has a solids concentration of less than 20 wt. %, in other embodiments less than 10 wt. %, in other embodiments less than 9 wt. %, and in other embodiments less than 8 wt. %, based on the total weight of the cement. In these or other embodiments, the cement has a solids concentration of greater than 4 wt. %, in other embodiments greater than 5 wt. %, and in other embodiments greater than 6 wt. %, based on the total weight of the cement. In one or more embodiments, the cement has a solids concentration of from about 4 to about 20 wt. %, in other embodiments from about 4 to about 10 wt. %, in other embodiments from about 5 to about 9 wt. %, and in other embodiments from about 6 to about 8 wt. %, based on the total weight of the cement.

In one or more embodiments, the polymer (i.e. cis-1,4-polyisoprene in a preferred embodiment) may be characterized by a number average molecular weight (Mn) of greater than 150, in other embodiments greater than 200, and in other embodiments greater than 225 kg/mol. In one or more embodiments, polymer may have a number average molecular weight (Mn) of from about 150 to about 500 kg/mol, in other embodiments from about 200 to about 450 kg/mol, and in other embodiments from about 225 to about 400 kg/mol. In these or other embodiments, the polymer may have a weight average molecular weight (Mw) of greater than 800, in other embodiments greater than 900, and in other embodiments greater than 950 kg/mol. In one or more embodiments, guayule rubber may have a weight average molecular weight (Mw) of from about 800 to about 3000 kg/mol, in other embodiments from about 900 to about 2000 kg/mol, and in other embodiments from about 950 to about 1500 kg/mol. In one or more embodiments, the polymer has a molecular weight distribution (Mw/Mn) of less than 7, in other embodiments less than 6, in yet other embodiments less than 5.5, and in still other embodiments less than 5. In one or more embodiments, polymer may have a molecular weight distribution of from about 3 to about 7, in other embodiments from about 4 to about 6, and in other embodiments from about 4.5 to about 5. The polymer molecular weight (Mw and Mn) can be determined by gel permeation chromatography (GPC) using THF as a solvent and polystyrene standards.

In one or more embodiments, the solids portion of the cement includes greater than 85 wt. %, in other embodiments greater than 90 wt. %, and in other embodiments greater than 95 wt. % cis-1,4-polyisoprene, based upon the total weight of the solids portion of the cement. In one or more embodiments, the solids portion of the cement includes from about 85 to about 99 wt. %, in other embodiments from about 90 to about 98 wt. %, and in other embodiments from about 95 to about 97 wt. % cis-1,4-polyisoprene, based on the total weight of the solids portion of the cement.

Other Constituents within Solids Portion of Polydiene Polymer Cement

In one or more embodiments, the solids portion of the cement may include other constituent materials that are found within guayule and/or natural rubber and/or polymer and materials optionally added to the cement prior to addition of the particulate filler.

In one or more embodiments, those additional constituents within the solids portion of the cement that derive from guayule include guayule resin. As those skilled in the art appreciate, guayule resin generally refers to non-polyisoprene low molecular weight compounds that generally have a molecular weight of less than about 3000 g/mole. Examples of compounds within the resin include, but are not limited to, monoterpenes, triterpenes (Argentatin A, B and C), sesquiterpene compounds (Guayulin A and B) and fatty acids (as free fatty acid, monoglycerides, diglycerides, triglycerides, or a combination thereof). Additionally, solids portion of the cement may include low molecular weight polyisoprene polymers and oligomers.

In one or more embodiments, the solids portion of the guayule cement may be characterized by a relatively low content of guayule resin. For example, the solids content of the guayule cement may include less than 7 wt. %, in other embodiments less than 6 wt. %, and in other embodiments less than 5 wt. % guayule resin or low molecular weight polyisoprene, based upon the total weight of the solids portion of the cement. In one or more embodiments, the solids portion of the cement includes from about 0.5 to about 7 wt. %, in other embodiments from about 1 to about 6 wt. %, and in other embodiments from about 2 to about 4 wt. % guayule resin or low molecular weight polyisoprene, based on the total weight of the solids portion of the cement. In one or more embodiments, the weight ratio of guayule resin to low molecular weight polyisoprene may be from about 0.5:1 to about 1.5:1, in other embodiments from about 0.7:1 to about 1.3:1, and in other embodiments from about 0.9:1 to about 1.1:1.

In one or more embodiments, the solids portion of the cement may include solids added to the cement prior to the addition of the particulate filler. In one or more embodiments, the solids portion of the cement may include an antidegradant such antioxidants and antiozonants. Examples of useful antidegradants include N,N'disubstituted-p-phenylenediamines, such as N-1,3-dimethylbutyl-N'phenyl-p-phenylenediamine (6PPD), N,N'-Bis(1,4-dimethylpently)-p-phenylenediamine (77PD), N-phenyl-N-isopropyl-p-phenylenediamine (IPPD), and N-phenyl-N'-(1,3-dimethylbutyl)-p-phenylenediamine (HPPD). Other examples of antidegradants include, acetone diphenylamine condensation product (Alchem BL), 2,4-trimethyl-1,2-dihydroquinoline (Alchem TMQ), octylated Diphenylamine (Alchem ODPA), and 2,6-di-t-butyl-4-methyl phenol (BHT).

When present, the solids portion of the cement may include less than 1 wt. %, in other embodiments less than 0.5 wt. %, and in other embodiments less than 0.3 wt. % antidegradant, based on the total weight of the solids portion. In one or more embodiments, the solids portion includes from about 0.05 to about 1 wt. %, in other embodiments from about 0.07 to about 0.5 wt. %, and in other embodiments from about 0.1 to about 0.3 wt. % antidegradant, based on the total weight of the solids portion.

Cement Solvent

In one or more embodiments, the cement includes a generally non-polar hydrocarbon solvent, which may be selected from $C_5$ to $C_{10}$ straight chain hydrocarbons, $C_5$ to $C_{10}$ branched chain hydrocarbons, $C_5$ to $C_{10}$ cyclic hydrocarbons, $C_6$ to $C_{10}$ aromatic hydrocarbons, and mixtures thereof. In various embodiments, combinations of solvents, including those that provide an azeotropic mixture, may be employed.

Specific examples of hydrocarbon solvents include pentane isomers such as n-pentane, iso-pentane, neo-pentane, and mixtures thereof, and hexane isomers such as n-hexane, iso-hexane, 3-methylpentane, 2,3-dimethylbutane, neohexane, cyclohexane, and mixtures thereof. Other useful examples include $C_6$ to $C_{10}$ aromatic hydrocarbons such as benzene, toluene, o-xylene, m-xylene, p-xylene, ethylbenzene, 1,2,3-trimethylbenzene, 1,2,4-trimethylbenzene, mesitylene, 2-ethyltoluene, 3-ethyltoluene, 4-ethyltoluene, and mixtures thereof.

In one or more embodiments, the cement includes a mixture of a non-polar hydrocarbon solvent and a polar organic solvent. Useful polar organic solvents include acetone, $C_1$-$C_4$ alcohols, $C_2$-$C_4$ diols, and mixtures thereof. In particular embodiments, the solvent is a mixture of acetone and hexanes. In other particular embodiments, the solvent is a mixture of acetone and iso-hexane. In yet other particular embodiments, the solvent is a mixture of iso-hexane, cyclohexane and acetone.

In one or more embodiments, where the cement solvent is a mixture of polar and non-polar solvents, the mixture may include less than 50 wt. %, in other embodiments less than 40 wt. %, in other embodiments less than 30 wt. %, and in other embodiments less than 20 wt. % polar solvent, with the balance including non-polar solvent. In one or more embodiments, the mixture may include from about 1 to about 50 wt. %, in other embodiments from about 10 to about 45 wt. %, and in other embodiments from about 20 to about 40 wt. % polar solvent with the balance including non-polar solvent.

Obtaining Guayule Rubber

According to embodiments of the present invention, the process of the invention includes obtaining the guayule rubber from a guayule plant. In one or more embodiments, this process may include providing a guayule plant material, mechanically fracturing the plant material, extracting organic material from the fractured plant material to form a miscella, and fractionating the miscella to provide a cement or swollen polymer mass. The swollen polymer mass or cement may then be diluted to provide the cement with the desired solids content. In one or more embodiments, the step of fracturing the guayule plant may include mechanically rupturing the stems by, for example, chopping, grinding, and/or macerating dried guayule stems. In one or more embodiments, these stems may include less than about 15 wt. %, or in other embodiments less than 10 wt. % leaves. In these or other embodiments, dried guayule stems include those that contain less than 25 wt. %, or in other embodiments from about 5 to about 20 wt. % moisture.

In one or more embodiments, the step of extracting the organic material from the fractured plant material includes combining the fractured plant material with a solvent that is adapted to dissolve the organic matter of the fractured plants. In one or more embodiments, the solvent includes a mixture of a hydrocarbon solvent (non-polar) and a polar organic solvent (e.g. 30 wt. % acetone and 70 wt. % hexanes). Those skilled in the art will be able to readily select an appropriate amount of solvent mixture to combine with the fractured plant material. For example, it may be common to add sufficient solvent to provide a weight ratio of solvent to bagasse of about 2:1 to about 4:1. The organic material that is dissolved in the solvent mixture is referred to as the miscella, and the miscella is then separated from the bagasse, which is the residual woody tissue. The separation of the miscella and the bagasse can be accomplished by using one or more known techniques including a multi-stage extraction technique and/or a countercurrent extraction technique.

Once the miscella is substantially separated from the bagasse, the miscella undergoes the step of fractionating to, among other things, separate those materials that are soluble in polar solvent (e.g. resin) from those constituents that are soluble in non-polar solvent (e.g. cis-1,4-polyisoprene). In one or more embodiments, the fractionating step includes the use of multistage countercurrent fractionation with concomitant addition of polar solvent (e.g. acetone) countercurrent to the flow of the miscella. Countercurrent fractionation and production of a swollen rubber mass is described, for example, in W. W. Schloman Jr., et al., “Processing Guayule for Latex and Bulk Rubber,” Industrial Crops and Products, 22, 41-47 (2005).

In one or more embodiments, the miscella can be diluted with additional acetone to precipitate the cis-1,4-polyisoprene in the form of a swollen rubber mass. The swollen rubber mass can then be diluted with additional hydrocarbon solvent or a mixture of at least one hydrocarbon solvent and at least one polar organic solvent to produce a cement with a desired solids content.

Particulate Filler

The composition utilized to form the solution masterbatch includes a particulate filler which is combined with the guayule cement and diluting liquid prior to resonant acoustic mixing to form the solution masterbatch. In a preferred embodiment, the particulate filler is one or more of powdered and non-agglomerated. In preferred embodiments, carbon black is utilized as the particulate filler.

Useful carbon blacks include, but are not limited to, furnace blacks, channel blacks and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In one or more embodiments, the carbon blacks employed in preparing the solution masterbatch may have a surface area of greater than 100 $m^2/g$, in other embodiments greater than 115 $m^2/g$, and in other embodiments greater than 130 $m^2/g$. In these or other embodiments, the carbon blacks have a surface area of from about 100 to about 200 $m^2/g$, in other embodiments from about 115 to about 175 $m^2/g$, and in other embodiments from about 130 to about 150 $m^2/g$. For purposes of this specification, and unless otherwise specified, carbon black surface area values are reported as N2 surface area determined by ASTM D-6556-19a.

The carbon black desirably has a small median particle size which allows suitable dispersion within the solution masterbatch. Accordingly, in various embodiments the carbon black is characterized by a median particle size (i.e. D50) of less than 65 nm, in other embodiments less than 60 nm, and in other embodiments less than 55 nm. In these or other embodiments, the carbon black is characterized by a median particle size of greater than 35 nm, in other embodiments greater than 40, and in other embodiments greater than 45 nm. In one or more embodiments, median particle size of the carbon black is from about 35 to about 65 nm, in other embodiments from about 40 to about 60 nm, and in other embodiments from about 45 to about 55 nm.

In one or more embodiments, the solution masterbatch may be characterized by the weight of carbon black relative to the weight of the polymer. In one or more embodiments, the solution masterbatch includes less than 75, in other embodiments less than 70, and in other embodiments less than 65 parts by weight carbon black per 100 parts by weight polymer. In these or other embodiments, the solution masterbatch includes greater than 20, in other embodiments greater than 30, and in other embodiments greater than 40 parts by weight carbon black per 100 parts by weight polymer. In one or more embodiments, the solution masterbatch includes from about 20 to about 75, in other embodiments from about 30 to about 70, and in other embodiments from about 40 to about 65 parts by weight carbon black per 100 parts by weight total polymer.

Diluting Liquid

The diluting liquid is utilized in the composition to form a solution masterbatch in order to aid in mixing the polymer and particulate filler to obtain a desirable dispersion with the polymer being provided within a particular solids range.

Any of the cement solvents described above can be utilized as the diluting liquid and are herein incorporated fully by reference. The choice of diluting liquid is polymer dependent as known to one of ordinary skill in the art.

In one or more embodiments, the polydiene polymer solution masterbatch has a solids concentration of less than 20 wt. %, in other embodiments less than 10 wt. %, in other embodiments less than 9 wt. %, and in other embodiments less than 8 wt. %, based on the total weight of the solution masterbatch. In these or other embodiments, the solution masterbatch has a solids concentration of greater than 4 wt. %, in other embodiments greater than 5 wt. %, and in other embodiments greater than 6 wt. %, based on the total weight of the solution masterbatch. In one or more embodiments, the solution masterbatch has a solids concentration of from about 4 to about 20 wt. %, in other embodiments from about 4 to about 10 wt. %, in other embodiments from about 5 to about 9 wt. %, and in other embodiments from about 6 to about 8 wt. %, based on the total weight of the solution masterbatch.

Other Additives

For the sake of clarity, it should be recognized that the composition utilized to form the solution masterbatch can also include other compounds in addition to the guayule cement, diluting liquid and particulate filler. The additional additives, such as those described hereinbelow with respect to the vulcanizable composition, can be utilized in suitable amounts to impart desired properties to the composition without substantially affecting the dispersion between the polymer and particulate filler. As known in the art, suitable amounts will vary depending upon the type of particular additive included in the composition prior to resonant acoustic mixing.

Resonant Acoustic Mixing

The composition comprising at least the polymer, diluting liquid and a particulate filler is subjected to resonant acoustic mixing (RAM) to form the solution masterbatch. During RAM, energy is acoustically transferred to the composition including the mixture of components to be mixed. Without wishing to be bound by theory, it is believed that resonant acoustic mixing introduces microscale turbulence by propagating acoustic waves at a relatively low frequency throughout the composition.

Vibrational energy is generated by a sound energy generator, producing an energy exchange within a spring-plate assembly. This in turn is what drives the platform holding the mix container. At the resonant frequency selected, forces from the sound energy generator will cancel out with spring forces precisely. This will impart all energy of the momentum into the compounded components.

Resonant acoustic mixers are commercially available from sources such as PCCA of Houston, Texas as PCCA RAM and Resodyn Acoustic Mixers of Butte, Mont. as LabRAM™, LabRAM™ II, Mixer™, PharmaRAM™ I, PharmaRAM™ II, OmniRAM™, RAM 5™ and RAM 55™.

RAM is distinguishable from other sonification and ultrasound techniques. Ultrasound generally employs relatively high frequencies, greater than 20 Khz. In the methods of the present invention, RAM is performed at a resonant frequency that generally ranges from about 30 to about 90 hz, desirably from about 58 to about 62 hz and preferably about 60 hz.

RAM devices generate a high level of energy by seeking and operating at the "resonant condition" of the mechanical system, preferably at all times. The RAM device monitors mixing condition changes multiple times per second to balance kinetic energy or mixing forces and potential energy restored forces. The structure of the device allows the RAM mixer to apply forcing energy directly to the composition to be mixed. The acoustic energy supplied ranges generally greater than or equal to 50 g (wherein 1 g=1 $m/s^2$) desirably greater than or equal to 60 g, and preferably greater than or equal to 70 g up to about 100 g.

While mixing times for typical shear force mixers such as Brabenders may extend several hours, resonant acoustic mixing takes much less time for equal size batches. Resonant acoustic mixing may perform for times that range from 2 to about 20 minutes, desirably from about 3 to about 10 minutes and preferably from about 4 to about 6 minutes. Of course, the period of time may depend upon the size of the composition that is subjected to resonant acoustic mixing and components utilized. Utilizing resonant acoustic mixing for too long of a period of time can cause the polymer to break down.

Methods for Forming the Solution Masterbatch

The materials desired to be resonant acoustic mixed are obtained in desired amounts and combined. Appropriate amounts of the components are weighed out. In one embodiment the polymer, for example as present in guayule cement, is diluted down with the diluting liquid from an initial solids content, and the particulate filler, such as carbon black, is added to the diluted polymer mixture.

The components are added to a container. Container choice depends upon compatibility with the diluting liquid as well as any solvents present in the polymer component such as guayule cement and the ability to be utilized in the RAM device mixing chamber. Once the container is charged with the desired components, it is placed into the RAM device and subjected to RAM for a period of time at a desired gravitational force and frequency.

Once RAM is finished, the solution masterbatch is formed and the container is removed from the device for further processing.

Liquid Removal/Drying

After RAM processing, the solution masterbatch is further processed to remove liquid therefrom to form a masterbatch material composition that is substantially a solid composite comprising solid components including the polymer and particulate filler.

Any suitable liquid removal technique can be utilized.

In one embodiment a drum dryer is utilized which includes heated roller mills set at a suitable temperature, such as about 127° C. (260° F.) to about 149° C. (300° F.) surface temperature sufficient to dry and remove the liquid from the solution masterbatch.

Other techniques as well as equipment for performing liquid removal, are generally known in the art. For example, the temperature of the solution masterbatch can be increased or maintained at a temperature sufficient to volatilize or evaporate the liquid present. Also, the pressure within the container in which the liquid removal is conducted can be decreased, which will assist with liquid removal and volatilization of any solvent present. Still further, the solution masterbatch can be agitated, which may further assist in removal of liquid from the masterbatch. In one embodiment, a combination of heat, decreased pressure and agitation can be employed.

In one embodiment, the temperature of the solution masterbatch, together with the pressure of the environment in which liquid is removed from a solution masterbatch within the container used for liquid removal is adjusted to promote liquid removal. For example, the liquid removal step may take place at a temperature of greater than 35° C., in other embodiments greater than 37° C., in other embodiments greater than 40° C., in other embodiments greater than 50° C., in other embodiments greater than 75° C., in other embodiments greater than 100° C., in other embodiments greater than 110° C., and in other embodiments greater than 120° C. under pressures of from about −5 to about −30 mm Hg. In one or more embodiments, the step of liquid removal takes place at a temperature of from about 35° C. to about 160° C., in other embodiments from about 37° C. to about 140° C., and in other embodiments from about 40° C. to about 130° C. under pressures of from about −5 to about −30 mm Hg.

Various techniques can be employed to agitate and/or impart shear on the solution masterbatch during liquid removal. As one of ordinary skill will appreciate, agitation can expose greater surface area thereby facilitating the liquid removal.

In one embodiment, a devolatizer can be employed as the vessel in which the step of liquid removal is conducted. Liquid removal can include a devolatizing extruder, which typically includes a screw apparatus that can be heated by an external heating jacket. These extruders are known in the art and may include single and twin screw extruders.

Alternatively, liquid removal can include extruder-like apparatus that include a shaft having paddles attached thereto. These extruder-like apparatus can include a single shaft or multiple shafts. The shaft can be axial to the length of the apparatus and the flow of the solution masterbatch through the device/vessel. The composition (i.e. solution masterbatch) may be forced through the apparatus by using a pump, and the shaft rotates thereby allowing the paddles to agitate the composition and thereby assist in the evolution of solvent. The paddles can be angled so as to assist movement of the composition through the devolatilizer, although movement of the composition through the devolatilizer can be facilitated by the pump that can direct the composition into the devolatilizer and may optionally be further assisted by an extruder that may optionally be attached in series or at the end of the devolatilizer (i.e., the extruder helps pull the composition through the devolatilizer).

Devolatilizers can further include backmixing vessels. In general, these backmixing vessels include a single shaft that includes a blade that can be employed to vigorously mix and masticate the composition (i.e. the solution masterbatch).

In certain embodiments, combinations of the various devolatilizing equipment can be employed to achieve desired results. These combinations can also include the use of extruders. In one example, a single shaft "extruder-like" devolatilizer (e.g., one including paddles) can be employed in conjunction with a twin-screw extruder. In this example, the solution masterbatch first enters the "extruder-like" devolatilizer followed by the twin-screw extruder. The twin-screw extruder advantageously assists in pulling the composition through the devolatilizer. The paddles of the devolatilizer can be adjusted to meet conveyance needs.

In a further embodiment, twin shaft extruder-like device can be employed. In certain embodiments, paddles on each shaft may be aligned so as to mesh with one another as they rotate. The rotation of the shafts can occur in the same direction or in opposite directions.

Liquid removal equipment is known in the art and commercially available and can be obtained from LIST (Switzerland); Coperion Werner & Phleiderer; or NFM Welding Engineers, Inc. (Ohio). Exemplary equipment available from LIST include DISCOTHERM™.

Vulcanizable Composition

According the present invention, the masterbatch material prepared as described above is used in the preparation of vulcanizable compositions, which when cured form the rubber vulcanizates. In addition to the masterbatch material, the vulcanizable compositions may also include other constituents such as, but not limited to, polymers that may be the same or different from those described hereinabove, reinforcing fillers, plasticizers, and curatives. Specific examples of these ingredients include, but not limited to, carbon black, silica, fillers, oils, resins, waxes, metal carboxylates, cure agents and cure coagents, anti-degradants, and metal oxides.

Exemplary elastomeric polymers that are useful in the practice of the present invention (i.e. included within the vulcanizable compositions), which may also be referred to as rubber polymers or vulcanizable polymers, include polydienes and polydiene copolymers. Specific examples of these polymer include, but are not limited to, polybutadiene, poly(styrene-co-butadiene), polyisoprene, poly(styrene-co-isoprene), and functionalized derivatives thereof. Other polymers that may be included in the polymer sample include neoprene, poly(ethylene-co-propylene), poly(styrene-co-butadiene), poly(ethylene-co-propylene-co-diene), polysulfide rubber, acrylic rubber, urethane rubber, silicone rubber, epichlorohydrin rubber, syndiotactic polybutadiene, and mixtures thereof or with polydienes and polydiene copolymers. These elastomers can have a myriad of macromolecular structures including linear, branched, and star-shaped structures. These elastomers may also include one or more functional units, which typically include heteroatoms tethered to the backbone of the polymer.

In one or more embodiments, additional fillers can be utilized.

Carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In one or more embodiments, suitable silica fillers include precipitated amorphous silica, wet silica (hydrated silicic acid), dry silica (anhydrous silicic acid), fumed silica, calcium silicate, aluminum silicate, calcium aluminum silicate, magnesium silicate, and the like.

In one or more embodiments, the surface area of the silica, as measured by the BET method, may be from about 32 to about 400 $m^2/g$ (including 32 $m^2/g$ to 400 $m^2/g$), with the range of about 100 $m^2/g$ to about 300 $m^2/g$ (including 100 $m^2/g$ to 300 $m^2/g$) being preferred, and the range of about 150 $m^2/g$ to about 220 $m^2/g$ (including 150 $m^2/g$ to 220 $m^2/g$) being included. In one or more embodiments, the silica may be characterized by a pH of about 5.5 to about 7 or slightly over 7, or in other embodiments from about 5.5 to about 6.8. Some of the commercially available silica fillers that can be used include, but are not limited to, those sold under the tradename Hi-Sil, such as 190, 210, 215, 233, and 243, by PPG Industries, as well as those available from Degussa Corporation (e.g., VN2, VN3), Rhone Poulenc (e.g., Zeosil™ 1165 MP), and J. M. Huber Corporation.

In one or more embodiments, silica coupling agents are included in the vulcanizable composition. As the skilled person appreciates, these compounds include a hydrolyzable silicon moiety (often referred to as a silane) and a moiety that can react with a vulcanizable polymer.

Suitable silica coupling agents include, for example, those containing groups such as alkyl alkoxy, mercapto, blocked mercapto, sulfide-containing (e.g., monosulfide-based alkoxy-containing, disulfide-based alkoxy-containing, tetrasulfide-based alkoxy-containing), amino, vinyl, epoxy, and combinations thereof. In certain embodiments, the silica coupling agent can be added to the rubber composition in the form of a pre-treated silica; a pre-treated silica has been pre-surface treated with a silane prior to being added to the rubber composition.

Non-limiting examples of alkyl alkoxysilanes suitable for use in certain embodiments include, but are not limited to, octyltriethoxysilane, octyltrimethoxysilane, trimethylethoxysilane, cyclohexyltriethoxysilane, isobutyltriethoxy-silane, ethyltrimethoxysilane, cyclohexyl-tributoxysilane, dimethyldiethoxysilane, methyltriethoxysilane, propyltriethoxysilane, hexyltriethoxysilane, heptyltriethoxysilane, nonyltriethoxysilane, decyltriethoxysilane, dodecyltriethoxysilane, tetradecyltriethoxysilane, octadecyltriethoxysilane, methyloctyldiethoxysilane, dimethyldimethoxysilane, methyltrimethoxysilane, propyltrimethoxysilane, hexyltrimethoxysilane, heptyltrimethoxysilane, nonyltrimethoxysilane, decyltrimethoxysilane, dodecyltrimethoxysilane, tetradecyltrimethoxysilane, octadecyltrimethoxysilane, methyloctyl dimethoxysilane, and mixtures thereof.

Non-limiting examples of bis(trialkoxysilylorgano)polysulfides suitable for use in certain embodiments include bis(trialkoxysilylorgano) disulfides and bis(trialkoxysilylorgano)tetrasulfides. Specific non-limiting examples of bis (trialkoxysilylorgano)disulfides suitable for use in certain embodiments include, but are not limited to, 3,3'-bis(triethoxysilylpropyl) disulfide, 3,3'-bis(trimethoxysilylpropyl) disulfide, 3,3'-bis(tributoxysilylpropyl)disulfide, 3,3'-bis(tri-t-butoxysilylpropyl)disulfide, 3,3'-bis(trihexoxysilylpropyl) disulfide, 2,2'-bis(dimethylmethoxysilylethyl)disulfide, 3,3'-bis(diphenylcyclohexoxysilylpropyl)disulfide, 3,3'-bis (ethyl-di-sec-butoxysilylpropyl)disulfide, 3,3'-bis (propyldiethoxysilylpropyl)disulfide, 12,12'-bis (triisopropoxysilylpropyl)disulfide, 3,3'-bis (dimethoxyphenylsilyl-2-methylpropyl)disulfide, and mixtures thereof. Non-limiting examples of bis(trialkoxysilylorgano)tetrasulfide silica coupling agents suitable for use in certain embodiments include, but are not limited to, bis(3-triethoxysilylpropyl)tetrasulfide, bis(2-triethoxysilylethyl) tetrasufide, bis(3-trimethoxysilylpropyl)tetrasulfide, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilyl-N,N-dimethylthiocarbamoyl tetrasulfide, 3-trimethoxysilylpropyl-benzothiazole tetrasulfide, 3-triethoxysilylpropylbenzothiazole tetrasulfide, and mixtures thereof. Bis(3-triethoxysilylpropyl)tetrasulfide is sold under the tradename Si 69 by Evonik Degussa Corporation.

Non-limiting examples of mercapto silanes suitable for use in certain embodiments include, but are not limited to, 1-mercaptomethyltriethoxysilane, 2-mercaptoethyltriethoxysilane, 3-mercaptopropyltriethoxysilane, 3-mercaptopropylmethyldiethoxysilane, 2-mercaptoethyltripropoxysilane, 18-mercaptooctadecyldiethoxychlorosilane, and mixtures thereof.

Non-limiting examples of blocked mercapto silanes suitable for use in certain embodiments include, but are not limited to, those described in U.S. Pat. Nos. 6,127,468; 6,204,339; 6,528,673; 6,635,700; 6,649,684; and 6,683,135, the disclosures of which are hereby incorporated by reference. Representative examples of the blocked mercapto silanes for use herein in certain exemplary embodiments disclosed herein include, but are not limited to, 2-triethoxysilyl-1-ethylthioacetate; 2-trimethoxysilyl-1-ethylthioacetate; 2-(methyldimethoxysilyl)-1-ethylthioacetate; 3-trimethoxysilyl-1-propylthioacetate; triethoxysilylmethylthioacetate; trimethoxysilylmethylthioacetate; triisopropoxysilylmethylthioacetate; methyldiethoxysilylmethylthioacetate; methyldimethoxysilylmethylthioacetate; methyldiisopropoxysilylmethylthioacetate; dimethylethoxysilylmethylthioacetate; dimethylmethoxysilylmethylthioacetate; dimethylisopropoxysilylmethylthioacetate; 2-triisopropoxysilyl-1-ethylthioacetate; 2-(methyldiethoxysilyl)-1-ethylthioacetate, 2-(methyldiisopropoxysilyl)-1-ethylthioacetate; 2-(dimethylethoxysilyl-1-ethylthioacetate; 2-(dimethylmethoxysilyl)-1-ethylthioacetate; 2-(dimethylisopropoxysilyl)-1-ethylthioacetate; 3-triethoxysilyl-1-propylthioacetate; 3-triisopropoxysilyl-1-propylthioacetate; 3-methyldiethoxysilyl-1-propyl-thioacetate; 3-methyldimethoxysilyl-1-propylthioacetate; 3-methyldiisopropoxysilyl-1-propylthioacetate; 1-(2-triethoxysilyl-1-ethyl)-4-thioacetylcyclohexane; 1-(2-triethoxysilyl-1-ethyl)-3-thioacetylcyclohexane; 2-triethoxysilyl-5-thioacetylnorbornene; 2-triethoxysilyl-4-thioacetylnorbornene; 2-(2-triethoxysilyl-1-ethyl)-5-thioacetylnorbornene; 2-(2-triethoxy-silyl-1-ethyl)-4-thioacetylnorbornene; 1-(1-oxo-2-thia-5-triethoxysilylphenyl)benzoic acid; 6-triethoxysilyl-1-hexylthioacetate; 1-triethoxysilyl-5-hexylthioacetate; 8-triethoxysilyl-1-octylthioacetate; 1-triethoxysilyl-7-octylthioacetate; 6-triethoxysilyl 1-hexylthioacetate; 1-triethoxysilyl-5-octylthioacetate; 8-trimethoxysilyl-1-octylthioacetate; 1-trimethoxysilyl-7-octylthioacetate; 10-triethoxysilyl-1-decylthioacetate; 1-triethoxysilyl-9-decylthioacetate; 1-triethoxysilyl-2-butylthioacetate; 1-triethoxysilyl-3-butylthioacetate; 1-triethoxysilyl-3-methyl-2-butylthioacetate; 1-triethoxysilyl-3-methyl-3-butylthioacetate; 3-trimethoxysilyl-1-propylthiooctanoate; 3-triethoxysilyl-1-propyl-1-propylthiopalmitate; 3-triethoxysilyl-1-propylthiooctanoate; 3-triethoxysilyl-1-propylthiobenzoate; 3-triethoxysilyl-1-propylthio-2-ethylhexanoate; 3-methyldiacetoxysilyl-1-propylthioacetate; 3-triacetoxysilyl-1-propylthioacetate; 2-methyldiacetoxysilyl-1-ethylthioacetate; 2-triacetoxysilyl-1-ethylthioacetate; 1-methyldiacetoxysilyl-1-ethylthioacetate; 1-triacetoxysilyl-1-ethylthioacetate; tris-(3-triethoxysilyl-1-propyl)trithiophosphate; bis-(3-triethoxysilyl-1-propyl)methyldithiophosphonate; bis-(3-triethoxysilyl-1-propyl)ethyldithiophosphonate; 3-triethoxysilyl-1-propyldimethylthiophosphinate; 3-triethoxysilyl-1-propyldiethylthiophosphinate; tris-(3-triethoxysilyl-1-propyl)tetrathiophosphate; bis-(3-triethoxysilyl-1-propyl)methyltrithiophosphonate; bis-(3-triethoxysilyl-1-propyl)ethyltrithiophosphonate; 3-triethoxysilyl-1-propyldimethyldithiophosphinate; 3-triethoxysilyl-1-propyldiethyldithiophosphinate; tris-(3-methyldimethoxysilyl-1-propyl)trithiophosphate; bis-(3-methyldimethoxysilyl-1-propyl)methyldithiophosphonate; bis-(3-methyldimethoxysilyl-1-propyl)-ethyldithiophosphonate; 3-methyldimethoxysilyl-1-propyldimethylthiophosphinate; 3-methyldimethoxysilyl-1-propyldiethylthiophosphinate; 3-triethoxysilyl-1-propylmethylthiosulfate; 3-triethoxysilyl-1-propylmethanethiosulfonate; 3-triethoxysilyl-1-propylethanethiosulfonate; 3-triethoxysilyl-1-propylbenzenethiosulfonate; 3-triethoxysilyl-1-propyltoluenethiosulfonate; 3-triethoxysilyl-1-propylnaphthalenethiosulfonate; 3-triethoxysilyl-1-propylxylenethiosulfonate; triethoxysilyl methylmethyl thiosulfate; triethoxysilylmethylmethanethiosulfonate; triethoxysilylmethylethanethiosulfonate; triethoxysilylmethylbenzenethiosulfonate; triethoxysilylmethyltoluenethiosulfonate; triethoxysilylmethylnaphthalenethiosulfonate; triethoxysilylmethylxylenethiosulfonate, and the like. Mixtures of various blocked mercapto silanes can be used. A further example of a suitable blocked mercapto silane for use in certain exemplary embodiments is that sold under the tradename NXT silane (3-octanoylthio-1-propyltriethoxysilane) by Momentive Performance Materials Inc.

In one or more embodiments, plasticizers include oils and solids resins. Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils. Suitable low PCA oils also include various plant-sourced oils such as can be harvested from vegetables, nuts, and seeds. Non-limiting examples include, but are not limited to, soy or soybean oil, sunflower oil, safflower oil, corn oil, linseed oil, cotton seed oil, rapeseed oil, cashew oil, sesame oil, camellia oil, jojoba oil, macadamia nut oil, coconut oil, and palm oil. As is generally understood in the art, oils refer to those compounds that have a viscosity that is relatively low compared to other constituents of the vulcanizable composition, such as the resins. In one or more embodiments, the resins may be solids with a Tg of greater than about 20° C., and may include, but are not limited to, hydrocarbon resins such as cycloaliphatic resins, aliphatic resins, aromatic resins, terpene resins, and combinations thereof. Useful resins include, but are not limited to, styrene-alkylene block copolymers, thermoplastic resins such as $C_5$-based resins, $C_5$-$C_9$-based resins, $C_9$-based resins, terpene-based resins, terpene-aromatic compound-based resins, rosin-based resins, dicyclopentadiene resins, alkylphenol-based resins, and their partially hydrogenated resins.

In one or more embodiments, the vulcanizable compositions of this invention include a cure system. The cure system includes a curative, which may also be referred to as a crosslinking agent, rubber curing agent or vulcanizing agents. Curing agents are described in Kirk-Othmer, ENCYCLOPEDIA OF CHEMICAL TECHNOLOGY, Vol. 20, pgs. 365-468, (3rd Ed. 1982), particularly Vulcanization Agents and Auxiliary Materials, pgs. 390-402, and A. Y. Coran, Vulcanization, ENCYCLOPEDIA OF POLYMER SCIENCE AND ENGINEERING, (2nd Ed. 1989), which are incorporated herein by reference. In one or more embodiments, useful cure systems include sulfur or sulfur-based cross-linking agents, organic peroxide-based crosslinking agents, inorganic crosslinking agents, polyamines crosslinking agents, resin crosslinking agents, oxime-based and nitrosamine-based cross-linking agents, and the like. Examples of suitable sulfur crosslinking agents include “rubbermaker’s” soluble sulfur; sulfur donating vulcanizing agents, such as an amine disulfide, polymeric polysulfide or sulfur olefin adducts; and insoluble polymeric sulfur. In other embodiments, the crosslinking agents include sulfur and/or sulfur-containing compounds. In other embodiments, the crosslinking agent excludes sulfur and/or sulfur-containing compounds. Vulcanizing agents may be used alone or in combination.

Other ingredients that are typically employed in rubber compounding may also be added to the rubber compositions. These include accelerators, accelerator activators, additional plasticizers, waxes, scorch inhibiting agents, processing aids, zinc oxide, tackifying resins, reinforcing or hardening resins, fatty acids such as stearic acid, peptizers, and antidegradants such as antioxidants and antiozonants.

Ingredient Amounts

The vulcanizable compositions can be characterized by the total polymeric content (i.e. polymer introduced via masterbatch material and any additional polymer added to the vulcanizable composition). In one or more embodiments, the vulcanizable compositions include greater than 20 wt. %, in other embodiments greater than 30 wt. %, and in other embodiments greater than 40 wt. % polymer, based on the total weight of the vulcanizable composition. In these or other embodiments, the vulcanizable compositions include less than 80 wt. %, in other embodiments less than 70 wt. %, and in other embodiments less than 60 wt. % polymer, based on the total weight of the vulcanizable composition. In one or more embodiments, the vulcanizable compositions include from about 20 to about 80 wt. %, in other embodiments from about 30 to about 70 wt. %, and in other embodiments from about 40 to about 60 wt. % polymer, based on the total weight of the vulcanizable composition polymer, based on the total weight of the vulcanizable composition.

In one or more embodiments, the vulcanizable compositions include a filler in addition to the particulate filler, that may be the same or different, such as carbon black or silica. In one or more embodiments, the vulcanizable compositions include greater than 10 parts, in other embodiments greater than 35 parts, and in other embodiments greater than 55 parts by weight of total filler per one hundred parts by weight of total polymer. In these or other embodiments, the vulcanizable compositions include less than 140 parts, in other embodiments less than 95 parts, and in other embodiments less than 75 parts by weight of total filler based on 100 parts by weight of total polymer. In one or more embodiments, the vulcanizates include from about 10 to about 200 parts, in other embodiments from about 10 to about 140 parts, in other embodiments from about 35 to about 95 parts, in other embodiments from about 40 to about 130 parts, in other embodiments from about 50 to about 120 parts, and in other embodiments from about 55 to about 75 parts by weight total filler per 100 parts by weight of total polymer. Carbon black and silica may be used in conjunction at a weight ratio of silica to carbon black of from about 0.1:1 to about 30:1, in other embodiments of from about 0.5 to about 20:1, and in other embodiments from about 1:1 to about 10:1.

In one or more embodiments, where silica is used as a filler, the vulcanizable compositions may include silica coupling agent. In one or more embodiments, the vulcanizable compositions may generally include greater than 1 part, in other embodiments greater than 2 parts, and in other embodiments greater than 3 parts silica coupling agent based on 100 parts by weight of total polymer. In these or other embodiments, the vulcanizable compositions may generally include less than 40 parts, in other embodiments less than 20 parts, and in other embodiments less than 10 parts silica coupling agent based on 100 parts by weight of total polymer. In one or more embodiments, the vulcanizable compositions include from about 1 to about 40 parts, in other embodiments from about 2 to about 20 parts, in other embodiments from about 2.5 to about 15 parts, and in other embodiments from about 3 to about 10 pbw silica coupling agent per 100 parts by weight of total polymer.

In these or other embodiments, the amount of silica coupling agent may be defined relative to the weight of the silica. In one or more embodiments, the amount of silica coupling agent introduced to the silica (either in situ or pre-reacted) is from about 1 to about 25 parts, in other embodiments from about 2 to about 20 parts, and in other embodiments from about 3 to about 15 parts silica coupling agent per 100 parts by weight of the silica.

The vulcanizable compositions may generally include greater than 5 parts, in other embodiments greater than 10 parts, and in other embodiments greater than 20 parts plasticizer (e.g. oils and solid resins) based on 100 parts by weight of total polymer. In these or other embodiments, the vulcanizable compositions may generally include less than 80 parts, in other embodiments less than 70 parts, and in other embodiments less than 60 parts by weight plasticizer based on 100 parts by weight of total polymer. In one or more embodiments, vulcanizable compositions may generally include from about 5 to about 80 parts, in other embodiments from about 10 to about 70 parts, and in other embodiments from about 20 to about 60 parts by weight plasticizer based on 100 parts by weight of total polymer. In further embodiments, the vulcanizable compositions may include less than 15 parts, alternatively less than 10 parts, or less than 5 parts by weight of liquid plasticizer based on 100 parts by weight of total polymer. In certain embodiments, the vulcanizable compositions are devoid of liquid plasticizer. In alternative embodiments, the vulcanizable compositions may include at least 20 parts of resin, at least 25 parts resin or at least 30 parts by weight resin based on 100 parts by weight of total polymer.

One of ordinary skill will be able to readily select the amount of vulcanizing agents to achieve the level of desired cure. In particular embodiments, sulfur is used as the cure agent. In one or more embodiments, the vulcanizable compositions may include greater than 0.5 part, in other embodiments greater than 1 part, and in other embodiments greater than 2 parts by weight sulfur based on 100 parts by weight of total polymer. In these or other embodiments, the vulcanizable compositions may generally include less than 10 parts, in other embodiments less than 7 parts, and in other embodiments less than 5 parts sulfur based on 100 parts by weight of total polymer. In one or more embodiments, the vulcanizable compositions may generally include from about 0.5 to about 10 parts, in other embodiments from about 1 to about 6 parts, and in other embodiments from about 2 to about 4 parts by weight sulfur based on 100 parts by weight of total polymer.

Preparation of Vulcanizate

In one or more embodiments, the vulcanizate is prepared by vulcanizing a vulcanizable composition. The vulcanizable compositions are otherwise prepared using conventional mixing techniques. The vulcanizable composition is then formed into a green vulcanizate and then subjected to conditions to effect curing (i.e. crosslinking) of the polymeric network.

For example, all ingredients of the vulcanizable compositions can be mixed with standard mixing equipment such as Banbury or Brabender mixers, extruders, kneaders, and two-rolled mills. In one or more embodiments, this may include a multi-stage mixing procedure where the ingredients are introduced and/or mixed in two or more stages. For example, in a first stage (which is often referred to as a masterbatch mixing stage), the masterbatch material of this invention, together with optional additional filler and optional ingredients are mixed. In one or more embodiments, where a silica coupling agent is used, it too may be added during one or more masterbatch stages. Generally speaking, masterbatch mixing steps include those steps where an ingredient is added and mixing conditions take place at energies (e.g. temperature and shear) above that which would scorch the composition in the presence of a curative. Similarly, re-mill mixing stages take place at the same or similar energies except an ingredient is not added during a re-mill mixing stage. It is believed that the energies imparted to the vulcanizable composition during masterbatch or re-mill mixing is sufficient to disperse the filler and to cause hydrolysis and subsequent condensation of the hydrolyzable groups. For example, it is believed that during one or more of these mix stages, the hydrolyzable groups of the silica functionalizing agents hydrolyze and then, via a condensation reaction, bond to the silica particles. To this end, in one or more embodiments, masterbatch or re-mill mixing may take place in presence of a catalyst that serves to promote the reaction between the hydrolyzable groups and the silica. These catalysts are generally known in the art and include, for example, strong bases such as, but not limited to, alkali metal alkoxides, such as sodium or potassium alkoxide; guanidines, such as triphenylguanidine, diphenylguanidine, di-o-tolylguanidine, N,N,N',N'-tetramethylguanidine, and the like; and hindered amine bases, such as 1,8-diazabicyclo[5.4.0]undec-7-ene, 1,5-diazabicyclo[4.3.0]non-5-ene, and the like, tertiary amine catalysts, such as N,N-dimethylcyclohexylamine, triethylenediamine, triethylamine, and the like, quaternary ammonium bases, such as tetrabutylammonium hydroxide, and bisaminoethers, such as bis(dimethylaminoethyl)ethers.

Accordingly, masterbatch and re-mill mixing takes place in the absence of the curative and proceed at temperatures above which the curing would otherwise take place if the curative was present. For example, this mixing can take place at temperatures in excess of 120° C., in other embodiments in excess of 130° C., in other embodiments in excess of 140° C., and in other embodiments in excess of 150° C.

Once the masterbatch is prepared, the vulcanizing agents may be introduced and mixed into the masterbatch in a final mixing stage, which is typically conducted at relatively low temperatures so as to reduce the chances of premature vulcanization. For example, this mixing may take place at temperatures below 120° C., in other embodiments below 110° C., in other embodiments below 100° C. Additional mixing stages, sometimes called remills, can be employed between the masterbatch mixing stage and the final mixing stage.

In one or more embodiments, a sulfur-based cure system is employed. The sulfur-based cure system is capable of forming monosulfide, disulfide or polysulfide covalently-bonded bridges between two chains, by reaction with unsaturations initially present in said chains. In one or more embodiments, the crosslinking agent includes sulfur, a sulfur-donating compound, a metal oxide, a bismaleimide, or a benzoquinone derivative. Examples of crosslinking agents include sulfur, dimorpholine disulfide, alkyl phenol disulfide, zinc and magnesium oxides, benzoquinone dioxime and m-phenylenebismaleimide. The curing package may further include one or more vulcanization aids, such as accelerators, retardants, synergists, fillers, heat stabilizers, radiation stabilizers, short-stoppers and moderating agents.

One of ordinary skill will be able to readily select the amount of vulcanizing agents to achieve the level of desired cure. Also, one of ordinary skill in the art will be able to readily select the amount of cure accelerators to achieve the level of desired cure.

INDUSTRIAL APPLICABILITY

As indicated above, the vulcanizable compositions of the present invention can be cured to prepare various tire components. These tire components include, without limitation, tire treads, tire sidewalls, belt skims, innerliners, ply skims, and bead apex. These tire components can be included within a variety of vehicle tires including passenger tires.

In particular embodiments, the vulcanizates of this invention include one or more components of a heavy vehicle tire, such as a tread or undertread of a heavy vehicle tire. As those skilled in the art appreciate, heavy vehicle tires include, for example, truck tires, bus tires, TBR (truck and bus tires), subway train tires, tractor tires, trailer tires, aircraft tires, agricultural tires, earthmover tires, and other off-the-road (OTR) tires. In one or more embodiments, the heavy vehicle tires may new tires as well as those tires that have been re-treaded. Heavy vehicle tires can sometimes be classified as to their use. For example, truck tires may be classified as drive tires (those that are powered by the truck engine) and steer tires (those that are used to steer the truck). The tires on the trailer of a tractor-trailer rig are also classified separately.

In particular embodiments, heavy vehicle tires are relatively large tires. In one or more embodiments, the heavy vehicle tires have an overall diameter (tread to tread) of greater than 17.5, in other embodiments greater than 20, in other embodiments greater than 25, in other embodiments greater than 30, in other embodiments greater than 40, and in other embodiments greater than 55 inches. In these or other embodiments, heavy vehicle tires have a section width of greater than 10, in other embodiments greater than 11, in other embodiments greater than 12, and in other embodiments great than 14 inches.

EXAMPLES

The examples set forth below are provided to illustrate the features of the solution masterbatch and masterbatch material produced therefrom utilizing resonant acoustic mixing. The examples are not intended to limit the scope of the invention.

The following test protocols were used for testing:

TABLE 1

| Test | Units | Test Method |
|---|---|---|
| Delta G'@90.98 DEG, sweep at room temperature | KPa | RPA Strain Sweep: .1-90°, 60 °C |
| Index | % | Indexed to equivalent Dry mix value at equivalent CB loading. Example provided indicates 73.83% index, or 26.17% lower/improvement over dry mix. See FIG. 1. |
| Molecular weight loss | % | CB_GPC Run before and after to determine MW loss: Run on Tosoh, IR Standard |
| Bound Rubber | % | Bound rubber was measured by immersing small pieces of uncured stocks in a large excess of toluene for three days. The soluble rubber was extracted from the sample by the solvent. After three days, any excess toluene was drained off and the sample was air dried and then dried in an oven at approximately 100 °C to a constant weight. The remaining pieces form gel containing the filler and some of the original rubber. The amount of rubber remaining with the filler is the bound rubber. The bound rubber content is then calculated according to the following: % Bound Rubber = 100⊠ (Wd − F) R (1) where Wd is the weight of dried gel, F is the weight of filler in gel or solvent insoluble matter (same as weight of filler in original sample), and R is the weight of polymer in original sample. |

Example 1 and Comparatives 1-3 shown in Table 2 below were prepared.

The procedure for producing the masterbatch material for Example 1 was as follows:

1) Compound materials were weighed out in appropriate amounts. The materials here included GR cement (Guayule Rubber) (30-35% of 50-50 wt. % hexane/acetone) diluted down to 20% TS, with isohexanes as diluting liquid and carbon black filler (non-agglomerated).
2) The mix components were combined in a jar suitable for containment and compatibility. Mix jars were 235 mL (8 oz) polypropylene containers with dimensions OD 3½", H 2⅝", for both compatibility with the solvent in this case and ability to place into a RAM I (Resodyn) mixing chamber. To produce sufficient sample for mixing, there had to be used 5 separate containers at the desired solids and fill levels.
3) Once the sample jar was charged with the desired materials, it was placed into the RAM device mixed for 5 minutes at 70 g to produce the solution masterbatch.
4) Once finished, the jar was removed and taken to a drum dryer (hot roller mills set at approximately 127° C. (260° F.), 149° C. (300° F.) surface temperature), and the cement/filler mixture is poured onto the rollers.
5) Most volatiles are removed and a solid sheet of masterbatch material was formed. This was then collected and set aside.
6) The process was repeated for the remaining containers, and all samples combined and submitted for testing as a single mix.

The Comparative Examples 1-3 were prepared by combining the components indicated, followed by mixing in a Brabender mixer.

Comparative Examples were mixed at a range of filler loading, from 50 to 60 PHR of carbon black in order to account for variation that can occur during measurement of polymer cements, which tend to vary from an initial measurement of total solids and can make exact targeting difficult.

Experimental data and results are summarized in Table 2.

TABLE 2

| Experiment | Example 1 | Comparative 1 | Comparative 2 | Comparative 3 |
|---|---|---|---|---|
| Mw Init | 449463 | 1101636 | 1234708 | 1412937 |
| Calculated Solids | 35.30 | N/A | N/A | N/A |
| Solution Mix | | | | |
| Time (min) | 5 | | | |
| Acceleration, G | 70 | | | |
| Compound Soln Solids (%) | 7 | | | |
| Components | | | | |
| Guayule cement | 100 | 100 | 100 | 100 |
| carbon black | 49.11 | 50 | 55 | 60 |
| Stearic acid | 2 | 2 | 2 | 2 |
| wax | 1 | 1 | 1 | 1 |
| antiozonant | 1 | 1 | 1 | 1 |
| Total weight | 153.11 | 154 | 159 | 164 |
| BB Settings | | | | |
| Init. Temp (C°) | 110 | 110 | 110 | 110 |
| Drop Temp(C°) | 170 | 170 | 170 | 170 |
| Time (min) | 5 | 5 | 5 | 5 |
| Mix Energy (W hr) | 15.749 | 11.42 | 13.059 | 13.503 |
| Performance | | | | |
| Delta G' | 282.79 | 388.7 | 524.64 | 717.86 |
| Mw Loss (%) | 48.08 | 53.38 | 66.20 | 70.01 |
| Bound Rubber (%) | 39.00 | 45.49 | 49.95 | 51.88 |

For portion of the RAM mix that was subjected to Brabender mixing, data for the Brabender conditions are summarized under "BB Settings".

Performance observations were collected for Payne Effect, Mw loss, and bound rubber %. The Mw loss is expressed as a percentage of the initial measured Mw. For example, a 45% loss would indicate the post processed material has lost 45% of the initial Mw measurement. This would be considered as a better result over a 50% loss, which has lost a greater proportion of chain length during processing.

Delta G', or Payne Effect, was measured on the RPA strain sweep test (0.98-90 deg sweep at room temperature). The result of Example 1 was recorded against Comparatives 1-3 ranging from 50-60 PHR of filler loading. Example 1 had a carbon black loading of 49 PHR. The resulting Payne effect reading was 282.8 KPa, a substantial decrease over the dry mix. This plot can be seen under FIG. 1. The superior filler dispersion of the RAM device is seen as responsible for this improvement. Example 1 was evaluated with Brabender mixing post processing.

Figure 2:
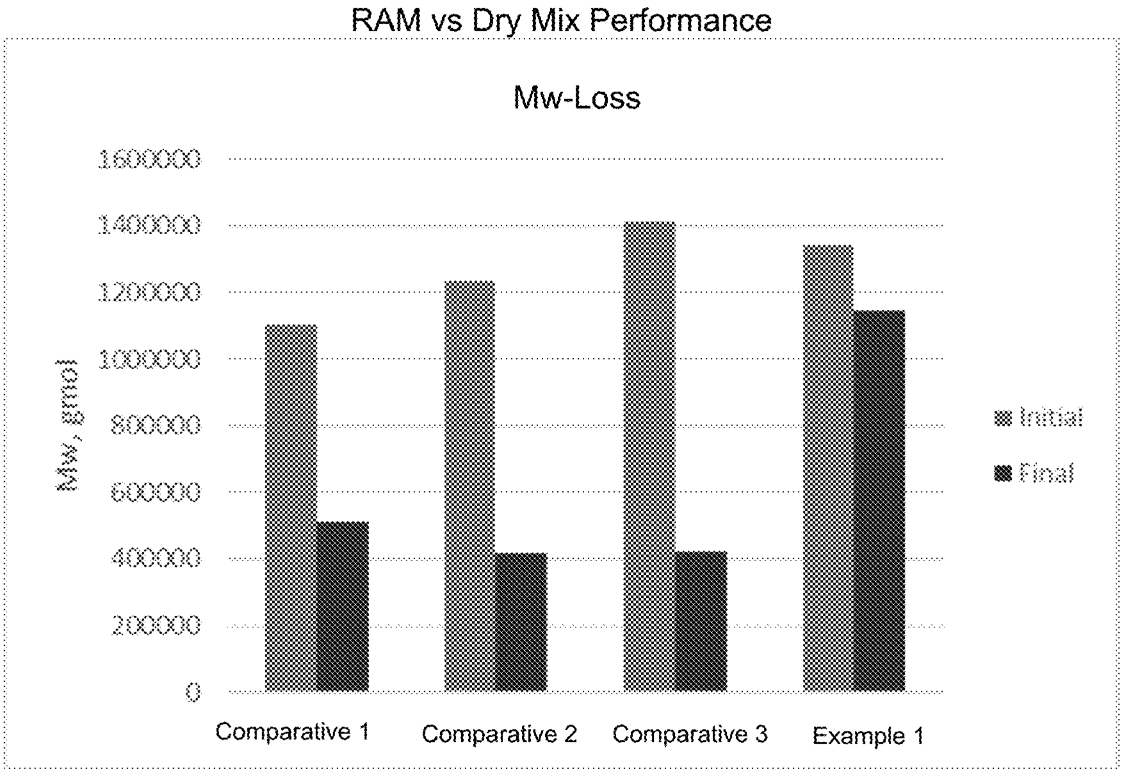
FIG. 2 is a chart showing resonant acoustic mixing versus dry mixing performance with respect to molecular weight loss of Comparative Examples 1-3, and Example 1.

Mw data under the performance tab is also only displayed for the Brabender-mixed Example 1. The sample shows an advantage in retaining Mw over similarly filled dry mixes. However, this amount is drastically increased when Mw is measured without processing on the Brabender. When solely subjected to RAM, the sample only loses about 17% of its Mw, an indication of the superiority of RAM over conventional methods This information is shown in FIG. 2. Most of the energy from the mixer was be directed into dispersion of material rather than chain degradation. A great deal of this is lost if further Brabender mixing is performed, as much as 48% of the original chain size was found to be lost if mixed with this method. However, enough of an advantage is provided through the RAM that a significant difference in Delta G' remains.

For the avoidance of doubt, it is noted that the invention relates to all possible combinations of features described herein, preferred in particular are those combinations of features that are present in the claims. It will therefore be appreciated that all combinations of features relating to the compositions according to the invention; all combinations of features relating to the processes according to the invention and all combinations of features relating to the compositions according to the invention and features relating to the processes according to the invention are described herein.

It is further noted that the term 'comprising' does not exclude the presence of other elements. However, it is also to be understood that a description on a product comprising certain components also discloses a product consisting of these components. Similarly, it is also to be understood that a description on a process comprising certain steps also discloses a process consisting of these steps. The product/composition consisting of these components may be advantageous in that it offers a simpler, more economical process for the preparation of the product/composition. The process consisting of these steps may be advantageous in that it offers a simpler, more economical process.

In accordance with the patent statutes, the best mode and preferred embodiment have been set forth; the scope of the invention is not limited thereto, but rather by the scope of the attached claims.

What is claimed is:

1. A method for producing a masterbatch material from a solution masterbatch, comprising the steps of:
- forming a composition comprising polydiene polymer, diluting liquid and a particulate filler;
- subjecting the composition to resonant acoustic mixing to form the solution masterbatch; and
- drying the solution masterbatch to form the masterbatch material;
- wherein the polydiene polymer comprises:
  - (a) a homopolymer obtained by polymerization of a conjugated diene monomer having from 4 to 12 carbon atoms;
  - (b) a copolymer obtained by copolymerization of a first conjugated diene monomer with one or more of a second different conjugated diene monomer and one or more ethylenically unsaturated monomers;
  - (c) a homopolymer obtained by polymerization of a non-conjugated diene monomer having from 5 to 12 carbon atoms;
  - (d) a copolymer obtained by copolymerization of a first non-conjugated diene and one or more of a second, different non-conjugated diene and one or more ethylenically unsaturated monomers;
  - (e) a ternary copolymer obtained by copolymerization of ethylene, an alpha-olefin having from 3 to 6 carbon atoms and a non-conjugated diene monomer having from 6 to 12 carbon atoms;
  - (f) a copolymer of isobutylene and isoprene, optionally halogenated;
  - (g) one or more of guayule polymer and natural rubber;

(h) an unsaturated olefinic copolymer, the chain of which comprises at least olefinic monomer units, and diene units derived from at least one conjugated diene; or (i) a mixture of two or more of (a) to (h) with one another; and wherein the drying step is performed using a roller mill having a temperature between about 127° C. (260° F.) to about 149° C. (300° F.).

2. The method according to claim 1, wherein the resonant acoustic mixing is performed a) at a resonant frequency between about 30 Hz and about 90 Hz and b) at an input force greater than or equal to 50 g up to 100 g.

3. The method according to claim 2, wherein the resonant acoustic mixing is performed a) at a resonant frequency between about 58 Hz and about 62 Hz and b) at an input force from about 60 g to about 100 g.

4. The method according to claim 2, wherein the diluting liquid is present in a sufficient amount so that a solids concentration of the polydiene polymer is present in amount from about 4 wt. % to about 20 wt. % based on the total weight of the composition.

5. A method for producing a masterbatch material from a solution masterbatch, comprising the steps of:

forming a composition comprising polydiene polymer, diluting liquid and a particulate filler so that the composition has a solids concentration of less than 20 wt. % based on the total weight of the composition, wherein the diluting liquid comprises a solvent;

subjecting the composition to resonant acoustic mixing to form the solution masterbatch; and drying the solution masterbatch to form the masterbatch material;

wherein the polydiene polymer comprises:

(a) a homopolymer obtained by polymerization of a conjugated diene monomer having from 4 to 12 carbon atoms;

(b) a copolymer obtained by copolymerization of a first conjugated diene monomer with one or more of a second different conjugated diene monomer and one or more ethylenically unsaturated monomers;

(c) a homopolymer obtained by polymerization of a non-conjugated diene monomer having from 5 to 12 carbon atoms;

(d) a copolymer obtained by copolymerization of a first non-conjugated diene and one or more of a second, different non-conjugated diene and one or more ethylenically unsaturated monomers;

(e) a ternary copolymer obtained by copolymerization of ethylene, an alpha-olefin having from 3 to 6 carbon atoms and a non-conjugated diene monomer having from 6 to 12 carbon atoms;

(f) a copolymer of isobutylene and isoprene, optionally halogenated;

(g) one or more of guayule polymer and natural rubber;

(h) an unsaturated olefinic copolymer, the chain of which comprises at least olefinic monomer units, and diene units derived from at least one conjugated diene; or (i) a mixture of two or more of (a) to (h) with one another; and wherein the resonant acoustic mixing is performed a) at a resonant frequency between about 30 Hz and about 90 Hz and b) at an input force greater than or equal to 50 g up to 100 g.

6. The method according to claim 5, wherein the particulate filler is one or more of powdered and non-agglomerated.

7. The method according to claim 6, wherein the particulate filler is present in an amount from about 20 to about 75 parts by weight based on 100 parts by weight of the polydiene polymer.

8. The method according to claim 7, wherein the particulate filler is present in an amount from about 30 to about 70 parts by weight based on 100 parts by weight ofpolydiene polymer.

9. The method according to claim 5, wherein the particulate filler is carbon black.

10. The method according to claim 9, further including the step of dispersing the carbon black in a carrier liquid prior to the step of forming the composition comprising polydiene polymer, the diluting liquid and the particulate filler.

11. The method according to claim 9, wherein the carbon black has one or more of the following properties:

a) a median particle size of less than 65 nm, and b) a surface area greater than 100 m2/g.

12. The method according to claim 5, wherein the polydiene polymer comprises a solids portion including cis-1,4-polyisoprene obtained from guayule.

13. The method according to claim 12, wherein the solids portion of the polydiene polymer includes one or more of:

a) greater than 85 wt. % cis-1,4-polyisoprene obtained from guayule, and b) from about 0.5 to about 7 wt. % guayule resin or low molecular weight polyisoprene.

14. The method according to claim 5, wherein the diluting liquid comprises one or more of each of $C_5$ to $C_{10}$ straight chain hydrocarbon, a $C_5$ to $C_{10}$ branched chain hydrocarbon, $C_5$ to $C_{10}$ cyclic hydrocarbon, and $C_6$ to $C_{10}$ aromatic hydrocarbon.

15. The method according to claim 5, wherein subjecting the composition to resonant acoustic mixing includes reciprocating displacement of the composition in a holding reservoir with vibrational energy created by a sound energy generator.

16. The method according to claim 5, wherein the resonant acoustic mixing is conducted from about 2 to about 40 minutes.

17. The method according to claim 5, wherein the drying step is performed using a roller mill having a temperature between about 127° C. (260° F.) to about 149° C. (300° F.).

18. A method for forming a vulcanizable composition, comprising the step of:

combining the masterbatch material according to claim 5 with a curative.

19. A method for forming a vulcanized component, comprising the step of:

curing the vulcanizable composition according to claim 18.

* * * * *